US006683942B1

(12) United States Patent
Sarp et al.

(10) Patent No.: US 6,683,942 B1
(45) Date of Patent: Jan. 27, 2004

(54) TELEPHONE SWITCHING SYSTEM WITH DATA INTEGRATION

(75) Inventors: S. Murad Sarp, Charlottesville, VA (US); Eoin Heaney, Nokomis, FL (US)

(73) Assignee: Comdial Corporation, Charlottesville, VA (US)

( * ) Notice: Subject to any disclaimer, the term of this patent is extended or adjusted under 35 U.S.C. 154(b) by 0 days.

(21) Appl. No.: 09/393,633

(22) Filed: Sep. 10, 1999

(51) Int. Cl.[7] .................................................. H04M 1/64
(52) U.S. Cl. .............................. 379/88.23; 379/88.27; 379/90.01; 379/265.02
(58) Field of Search .................. 379/88.02, 265.01, 379/265.02, 247, 428.03, 88.25, 88.22, 88.11, 88.12, 88.16, 88.19, 88.17, 74, 77, 84, 88.18, 88.27, 88.23, 93.01, 93.09, 90.01

(56) References Cited

U.S. PATENT DOCUMENTS

| | | | |
|---|---|---|---|
| 5,175,761 A | 12/1992 | Khalid et al. ................. 379/89 |
| 5,195,128 A | 3/1993 | Knitl ............................ 379/67 |
| 5,222,125 A | 6/1993 | Creswell et al. .............. 379/67 |
| 5,260,986 A | 11/1993 | Pershan ....................... 379/57 |
| 5,311,576 A | * 5/1994 | Brunson et al. .............. 379/89 |
| 5,335,266 A | 8/1994 | Richardson et al. .......... 379/88 |
| 5,349,636 A | 9/1994 | Irribarren .................... 379/89 |
| 5,351,276 A | 9/1994 | Doll et al. .................... 379/67 |
| 5,422,936 A | 6/1995 | Atwell ......................... 379/88 |
| 5,450,488 A | 9/1995 | Pugaczewski et al. ........ 379/67 |
| 5,455,852 A | 10/1995 | Elrod et al. .................. 379/67 |
| 5,463,676 A | * 10/1995 | Ohsawa .................... 379/88.11 |
| 5,471,523 A | 11/1995 | Smith et al. ................. 379/165 |
| 5,757,897 A | * 5/1998 | LaBarbera et al. ......... 379/165 |
| 5,844,968 A | * 12/1998 | Choi ........................ 379/88.25 |
| 5,946,386 A | * 8/1999 | Rogers et al. .............. 379/265 |
| 6,028,922 A | * 2/2000 | Deutsch et al. ............. 379/211 |
| 6,396,906 B1 | * 5/2002 | Kaplan ....................... 379/67.1 |
| 6,396,908 B1 | * 5/2002 | O'Donovan et al. ..... 379/88.12 |

* cited by examiner

*Primary Examiner*—Fan Tsang
*Assistant Examiner*—Ovidio Escalante
(74) *Attorney, Agent, or Firm*—Holland & Knight LLP (57) ABSTRACT

A telephone switching system and computer implemented method to enhance the integration of an independent voice mail system and a telephone exchange switch. The system also includes telephone sets in communication with the switch and a voice mail system with the telephone sets which include a display device and a manual switch that provide an interactive relationship between the telephone set and the user. Predetermined messages are exchanged serially between the voice mail system and the telephone exchange switch to provide enhanced functionality of the telephone switching system.

8 Claims, 9 Drawing Sheets

TELEPHONE SWITCHING SYSTEM WITH DATA INTEGRATION

BACKGROUND OF THE INVENTION

The present invention relates broadly to telephone switching systems and, more particularly, to a telephone switching system having an independent voice mail facility integrated with a telephone exchange switch for data exchange therebetween to provide enhanced messaging functions and system control.

Generally, telephone exchange switches are used in businesses to control several multi-line, multi-function telephone sets. The switches can provide routing and control of calls that are both internal to the business at various numbered extensions and calls that are external to the business. It should be noted that telephone exchange switches are used in businesses, but are also used in any situation where multi-line, multi-function telephones may be helpful. The term "business" as used herein, is used in a general sense to describe any such usage of commercial telephone switch systems.

During the last decade, organizations around the country have reaped the benefits of digital technology. Ever more powerful desktop computers have increased the ability to organize and access information. Digital technology has also had its impact on telephone systems. Digital voice transmission has improved the sonic quality of telephonic communications. Digital telephones can be controlled by software applications to provide enhanced calling features. Further, the combination of telephones and desktop computers has expanded the capabilities of telephone systems by allowing the system to access the processing power and software available to a desktop computer.

One of the areas wherein digital technology has provided a benefit is voice mail. Voice mail systems allow callers, both internal and external, to leave voice recordings of memoranda or short messages that can be accessed at a later time by a recipient. Each telephone set associated with a voice mail system will have a designated message location, known commonly as a "mailbox." If a caller accesses a mailbox associated with a given telephone set, a voice recording may be stored for selective later retrieval by recipient.

Currently, many voice mail systems are substantially independent of the telephone exchange switch and are provided as computer software that will store messages in memory and control rudimentary operation of the voice mail system. Nevertheless, independent voice mail systems can offer advantages and are in common use. Optionally, a voice mail system may be integrated with the telephone exchange switch. In order for the voice mail system to communicate with the telephone switch, DTMF (dual tone multi-frequency) signals are used to provide control signals between the independent voice mail system and the telephone exchange switch.

When a call for a telephone user arrives at the switch, the switch transmits the user's number to the independent voice mail system and the independent voice mail system therefore may perform its own functions. Typically such connection has been through a DTMF type interface.

The DTMF interface has proven limited in its ability to provide services for the system users, particularly in a situation where an automated call distribution system is used.

An automated call distribution system is typically used in a business or other commercial or public service environments where several lines will service incoming calls without regard to specific caller/recipient connections. For example, a customer service line may include several customer service representatives, and a customer will call in to the line and receive the first available customer service representative. Such an automated call distribution system will receive the call, place it in a queue with other calls ahead of the call in question, and route the call to the first available customer service representative. A manager will sometimes need to monitor the on-going call distribution process to maximize efficiency, for example, in the form of maximizing the number of available representatives.

Such a system can be severely limited by the DTMF connection between voice mail and the switch. The limited amount of information that can be sent on a DTMF connection precludes certain services that can be made available if data were transferred in a more efficient manner, particularly in a manner that would provide more capacity.

It has therefore been developed to provide a data line, sometimes in the form of an RS232 connector between the desktop computer operating the voice mail system and the telephone exchange switch. The data interface between the exchange and the independent voice mail system provides enhanced capabilities with respect to data transfer between the exchange and the independent voice mail system. Nevertheless, even though the data interface is available, conditions exist for advancements in the areas of telephone control, particularly when automated call distribution systems are employed, and in the areas of message transfer and efficient system operations.

SUMMARY OF THE INVENTION

It is accordingly an object of the present invention to provide a telephone switching system which employs data integration of an independent voice mail system and a telephone exchange switch which can provide enhanced telephone control, especially when using an automated call distribution system.

It is another object of the present invention to provide such a system which enhances the use of a display unit associated with the telephone.

It is a further object of the present invention to provide such a system which can allow one button or "soft key" interfacing between a user and the telephone set, based on messages received through the use of data integration.

To those ends, a telephone switching system for facilitating and controlling voice and data communication among and between telephone sets, both internal to the system and external to the system. The system includes a telephone exchange switch having an arrangement for forming predetermined messages and a voice mail system in electronic communication with the telephone exchange switch using a data communications link for message exchange between the telephone exchange switch and the voice mail system. The data link is in addition to a voice link between the telephone exchange switch and the voice mail system. The voice mail system also includes an arrangement for forming predetermined messages for the message exchange and at least one telephone set in electronic communication with the telephone exchange switch. The telephone set includes an arrangement for displaying alphanumeric characters in a human readable form and is operable responsive to at least one message received from the telephone exchange switch resulting from the message exchange between the telephone exchange switch and the voice mail system. The telephone set also includes at least one manual switch for sending a signal to the telephone exchange switch operable in response to the message received from the telephone exchange switch resulting from the message exchange between the telephone exchange switch and the voice mail system. The signal is indicative of a predetermined response to the message from the voice mail system.

It is preferred that the data communications link is a serial communications link.

It is further preferred that the arrangements for forming predetermined messages for the message exchange include preprogrammed computer processors. It is further preferred that the arrangement for displaying alphanumeric characters in a human readable form includes a display device associated with the telephone set for displaying messages from the voice mail system directed to a user of the telephone set to convey information regarding conditions associated with the voice mail system.

Preferably, the arrangement for displaying alphanumeric characters in a human readable form includes a display device associated with the telephone set for displaying messages from the voice mail system directed to a user of the telephone set to convey information regarding conditions associated with the voice mail system. The at least one manual switch is operatively associated with a displayed message for a predetermined user response.

The voice mail system may also include an arrangement for obtaining a calling party's number from an incoming telephone signal, and the arrangement for forming predetermined messages may include an arrangement for forming a message for data transmission to the telephone exchange switch to cause the display device to display characters indicative of the calling party's number.

It is preferred that the arrangement for obtaining a calling party's number from an incoming telephone signal includes an arrangement for selectively prompting a caller to enter predefined digits. It is further preferred that the arrangement for obtaining a calling party's number from an incoming telephone signal includes an arrangement for collecting the predefined digits for transmission to the telephone set through the data link and the switch for display on the display device.

The voice mail system preferably includes an arrangement for obtaining a calling party's number from an incoming telephone signal. Further, the arrangement for forming predetermined messages preferably includes an arrangement for forming a message for data transmission to the telephone exchange switch to cause the display device to display characters indicative of the calling party's number and of a response message, wherein activation of the at least one manual switch causes transmission of the predetermined response message.

The voice mail system additionally preferably includes an arrangement for controlling the arrangement for displaying alphanumeric characters in a human readable form in the absence of a connection between a telephone set and a mailbox associated with the telephone set.

It is preferential that the system includes a plurality of telephone sets connected to the telephone exchange switch, each of the telephone sets having a designated message location associated with the voice mail system, with each message location being accessible by a respective telephone set for communication therebetween. The system preferably further includes an arrangement for distributing a message from a first telephone set for receipt by at least one second telephone set without the first telephone set having accessed a designated message location associated therewith, the message being deliverable to a message location associated with the at least one second telephone set using the data link responsive to a user of the first telephone set activating the at least one manual switch. Preferably, the message is a voice memo directed from the first telephone set to the second telephone set. The switch preferentially includes an arrangement to initiate a call to the voice mail system, the call including a designated message location associated with the second telephone set.

The system preferably further includes an automated call distribution system associated with the voice mail system and a plurality of telephone sets connected to the telephone exchange switch. Each of the telephone sets has a designated message location associated with the voice mail system, with each message location being accessible by a respective telephone set for communication therebetween. The system further includes an arrangement for determining a state associated with each telephone set being controlled by the automated call distribution system with the state defining whether each telephone being controlled by the automated call distribution system is in a busy condition. An arrangement is preferably provided for communicating the state for each telephone set being controlled by the automated call distribution system to the voice mail system as a state message using the data link. The voice mail system preferably further includes an arrangement for monitoring each state message and transferring incoming telephone calls to telephone sets for which the respective state message indicates as being idle.

The voice mail system may also include an arrangement for selectively initiating and stopping the generation of each state message for any specific station. It is preferred that the telephone exchange switch includes an arrangement for determining whether each telephone set being controlled by the automated call distribution system changes from an idle condition to a busy condition and, upon detection of the change, transmitting the state message to the voice mail system.

The system preferably includes an automated call distribution system associated with the voice mail system and a plurality of telephone sets connected to the telephone exchange switch. Each of the telephone sets has a designated message location associated with the voice mail system and the voice mail system includes an arrangement for controlling information displayed on the display device that is operable by a user of at least one telephone set without the at least one telephone set being interconnected by a voice connection to its respective message location.

Preferably, the arrangement for controlling information displayed on the display device includes an arrangement for sending an initial message to open the display device, at least one message to provide information regarding the automated call distribution system, and a message to close the display device.

It is preferred that the system includes a plurality of telephone sets connected to the telephone exchange switch, and each of the telephone sets has a designated message location associated with the voice mail system. The system further preferably includes an arrangement for supplying information regarding each respective telephone set from the switch to the voice mail system for updating information used by the voice mail system with respect to each telephone set. The voice mail system preferentially maintains a database of information relating to each telephone set and a respective designated message location thereof, and the arrangement for supplying information regarding each respective telephone set includes an arrangement for supplying information to update the database.

Preferably, the telephone switching system further includes a second telephone exchange switch remotely disposed from the first telephone exchange switch; an arrangement for electronically connecting the second telephone exchange switch to the first telephone exchange switch through the internet; and at least one second telephone set in electronic communication with the second telephone exchange switch. The second telephone set includes an arrangement for displaying alphanumeric characters in a human readable form operable in response to at least one message received from the second telephone exchange switch resulting from the message exchange between the second telephone exchange switch and the voice mail system through the internet and the first telephone exchange switch. The second telephone set further includes at least one manual switch for sending a signal to the second telephone exchange switch in response to the message received from the second telephone exchange switch resulting from the message exchange between the second telephone exchange switch and the voice mail system through the internet and the first telephone exchange switch. The signal is indicative of a predetermined response to the message from the voice mail system.

The present invention preferably further includes a computer implemented method for operating a telephone switching system for facilitating and controlling voice and data communication among and between telephone sets, both internal to the system and external to the system. The method includes the steps of:

(a) providing the telephone switching system with a telephone exchange switch having an arrangement for forming predetermined messages;

(b) providing a voice mail system in electronic communication with the telephone exchange switch using a data communications link for message exchange between the telephone exchange switch and the voice mail system, said voice mail system including means for forming predetermined messages;

(c) providing at least one telephone set in electronic communication with the telephone exchange switch, the telephone set including an arrangement for displaying alphanumeric characters in a human readable form, the arrangement for displaying being operable responsive to at least one message received from the telephone exchange switch resulting from the message exchange between the telephone exchange switch and the voice mail system, said telephone set including at least one manual switch operatively associated with said means for displaying;

(d) forming predetermined messages for the message exchange using the voice mail system and the telephone exchange switch;

(e) exchanging the predetermined messages between the voice mail system and the telephone exchange switch; and (f) operating the arrangement for displaying in response to at least one message received from the telephone exchange switch resulting from the message exchange between the telephone exchange switch and the voice mail system.

The method preferably further includes the steps of providing preprogrammed computer processors as the arrangements for forming predetermined messages for the message exchange; providing a display device as the arrangement for displaying alphanumeric characters in a human readable form, the display device being associated with the telephone set; displaying messages from the voice mail system on the display device, the messages being directed to a user of the telephone set to convey information regarding conditions associated with the voice mail system.

It is preferred that the method further includes the step of sending a signal using the at least one manual switch, the message being sent to the telephone exchange switch responsive to the message received from the telephone exchange switch resulting from the message exchange between the telephone exchange switch and the voice mail system. The signal is indicative of a predetermined response to the message.

The method also may further include the steps of providing a display device as the arrangement for displaying alphanumeric characters in a human readable form, with the display device being associated with the telephone set; displaying messages from the voice mail system directed to a user of the telephone set to convey information regarding conditions associated with the voice mail system; providing at least one manual switch being operatively associated with a displayed message for a predetermined user response; and responding to the conveyed information using the at least one manual switch.

The method further preferentially includes the steps of obtaining a calling party's number from an incoming telephone signal using the voice mail system; forming a predetermined message for data transmission to the telephone exchange switch using the voice mail system; and transmitting the predetermined message to the telephone exchange switch to cause the display device to display characters indicative of the calling party's number.

It is preferred that the step of obtaining a calling party's number from an incoming telephone signal includes prompting a caller to enter predefined digits, and collecting the predefined digits for transmission to the telephone set through the data link and the switch for display on the display device.

The method further preferably includes the steps of obtaining a calling party's number from an incoming telephone signal using the voice mail system; forming a predetermined message for data transmission to the telephone exchange switch to cause the display device to display characters indicative of the calling party's number and of a response message; transmitting the predetermined message to the telephone exchange switch to cause the display device to display characters indicative of the calling party's number; and transmitting the predetermined response message using the at least one manual switch.

The method preferably includes the step of controlling the arrangement for displaying alphanumeric characters in a human readable form using the voice mail system in the absence of a connection between a telephone set and a mailbox associated with the telephone set.

It is preferential that the method further includes the steps of providing a plurality of telephone sets connected to the telephone exchange switch, each of the telephone sets having a designated message location associated with the voice mail system, each message location being accessible by a respective telephone set for communication therebetween; creating a voice memo using a first telephone set; distributing the voice memo from the first telephone set for receipt by at least one second telephone set without the first telephone set having accessed a designated message location associated therewith, the message being deliverable to a message location associated with the at least one second telephone set using the data link responsive to a user of the first telephone set activating the at least one manual switch.

It is further preferred that the method includes the steps of providing an automated call distribution system associated with the voice mail system and a plurality of telephone sets connected to the telephone exchange switch, each of the telephone sets having a designated message location associated with the voice mail system, each message location being accessible by a respective telephone set for communication therebetween; determining a state associated with each telephone set being controlled by the automated call distribution system using the telephone exchange switch, the state defining whether each telephone being controlled by the automated call distribution system is in a busy condition; communicating the state for each telephone set being controlled by the automated call distribution system to the voice mail system as a state message using the data link; monitoring each state message and transferring incoming telephone calls to telephone sets for which the respective state message indicates as being idle, the monitoring and transferring being performed by the voice mail system.

The method preferably includes the steps of selectively initiating and stopping the generation of each state message using the voice mail system; determining whether each telephone set being controlled by the automated call distribution system changes from an idle condition to a busy condition using the telephone exchange switch; and transmitting, upon detection of the change, the state message to the voice mail system.

The method also preferably includes the steps of providing an automated call distribution system associated with the voice mail system and a plurality of telephone sets connected to the telephone exchange switch, each of the telephone sets having a designated message location associated with the voice mail system; and controlling information displayed on the display device by a user of at least one telephone set using the voice mail system without the at least one telephone set being interconnected by a voice connection to its respective message location.

It is preferential that the step of controlling information displayed on the display device includes sending an initial message to open the display device; sending at least one message to provide information regarding the automated call distribution system; and sending a message to close the display device.

The method further preferably includes the steps of providing a plurality of telephone sets connected to the telephone exchange switch, each of the telephone sets having a designated message location associated with the voice mail system and supplying information regarding each respective telephone set from the switch to the voice mail system for updating information used by the voice mail system with respect to each telephone set.

It is preferred that another preferred embodiment of the method of the present invention include the step of providing a telephone exchange switch that includes providing a first telephone exchange switch. The method further includes the steps of:

(a) providing a second telephone exchange switch remotely disposed from the first telephone exchange switch;

(b) providing an arrangement for electronically connecting the second telephone exchange switch to the first telephone exchange switch through the internet;

(c) providing at least one second telephone set in electronic communication with the second telephone exchange switch, the second telephone set including an arrangement for displaying alphanumeric characters in a human readable form, the arrangement for displaying being operable responsive to at least one message received from the second telephone exchange switch resulting from the message exchange between the second telephone exchange switch and the voice mail system, through the internet and the first telephone exchange switch, the second telephone set further including at least one manual switch for sending a signal to the second telephone exchange switch responsive to the message received from the second telephone exchange switch resulting from the message exchange between the second telephone exchange switch and the voice mail system through the internet and the first telephone exchange switch, the signal being indicative of a predetermined response to the message from the voice mail system;

(d) connecting the second telephone exchange switch with the first telephone exchange switch using the internet connection;

(e) forming predetermined messages for the message exchange using the voice mail system and the second telephone exchange switch;

(f) exchanging the predetermined messages between the voice mail system and the second telephone exchange switch through the first telephone exchange switch and the internet connection; and (g) operating the arrangement for displaying responsive to at least one message received from the second telephone exchange switch resulting from the message exchange between the second telephone exchange switch and the voice mail system.

It is further preferred that the method include the step of sending a signal using the at least one manual switch, the message being sent to the second telephone exchange switch in response to the message received from the second telephone exchange switch resulting from the message exchange between the second telephone exchange switch and the voice mail system through the first telephone exchange switch and the internet connection, the signal being indicative of a predetermined response to the message received from the second telephone exchange switch.

By the above, the present invention provides a telephone system that uses a data link to integrate an independent voice mail system with a telephone exchange switch to provide more efficient use of resources and a wider array of features than was previously available. Further, when using an automated call distribution system, the present invention can enhance the versatility and efficiency of the system.

DESCRIPTION OF THE PREFERRED EMBODIMENT

Figure 1:
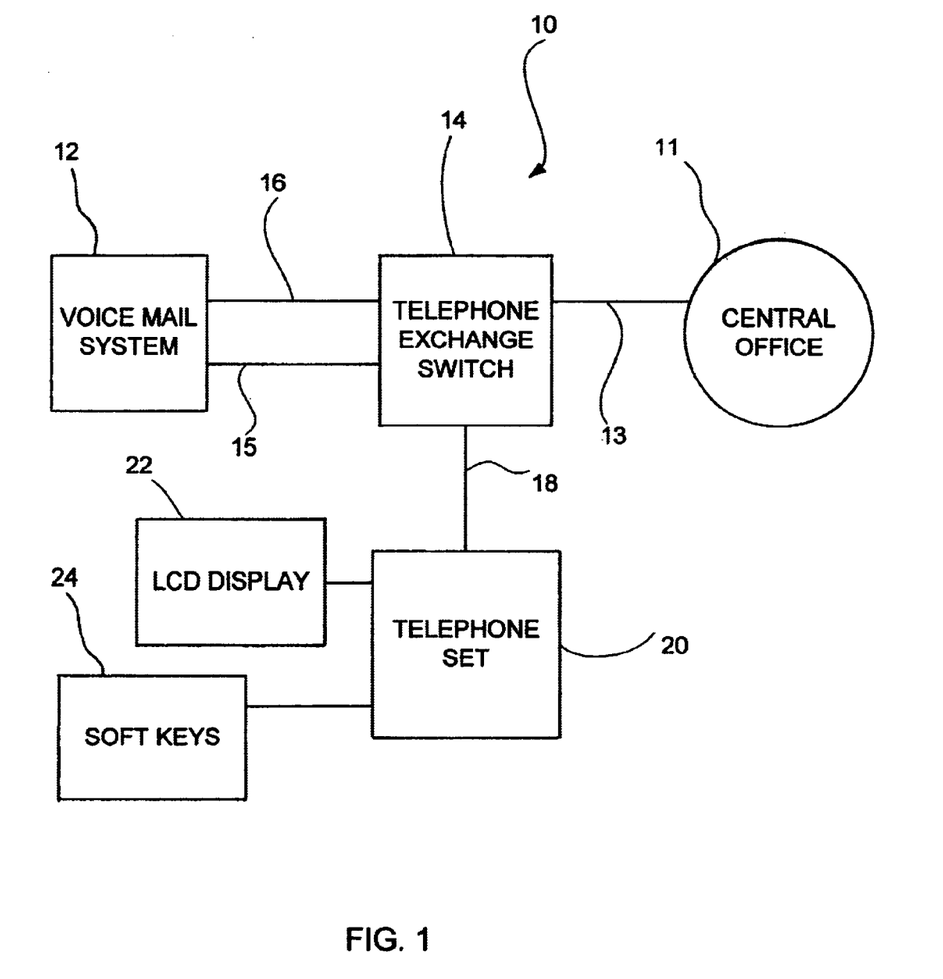
FIG. 1 is block diagram of a telephone switching system according to the referred embodiment of the present invention.

Turning now to the drawings, and, more particularly, to FIG. 1, a telephone switching system using data integration for enhanced capabilities is illustrated generally at 10 and includes a voice mail system 12 in electronic communication with a telephone exchange switch 14. The electronic communication is accomplished using a data link illustrated generally at 16. The data link may be a serial link, such as an RS232 type link, however other types of links can provide an effective data connection. It should therefore be understood that the present invention is not limited to either a serial link or an RS232 connection. A voice link 15 is provided to carry voice signals between the telephone exchange switch 14 and the voice mail system 12. The telephone exchange switch 14 is in electronic communication with at least one telephone set 20 using standard telephone cabling 18. Further, the telephone exchange switch is in electronic communication with a central office 11 of a public network through standard telephone cabling 13.

The telephone set 20 is a multi-line, multi-function telephone set including a liquid crystal diode (LCD) display 22 and at least one manual switch or "soft key" 24 associated with the LCD display 22 so that a user may respond to commands displayed on the LCD display 22 using a selected or predesignated soft key 24. The combination of the LCD display 22 and soft keys 24 provides an interactive telephone set 20.

The voice mail system 12 is an independent voice mail system which consists generally of a desktop or other computer having software configured to run the voice mail system. The computer provides memory locations which are indexed to specific telephone sets 20 which provide designated locations or "mailboxes" for telephone exchange users. The voice mail computer can also be provided with software that will perform the function of an automated call distribution system. Such a call distribution system is useful for multiple line telephone systems having a single call-in number. For example, in a technical support situation, several customer representatives may be reachable through a single phone number. The automated call distribution system will monitor incoming calls, place these calls in queue as they arrive and distribute the calls to available customer representatives. As will be seen, the present invention enhances the ability of the automated call distribution system to provide efficient call distribution service.

The telephone exchange switch 14 is provided to control and distribute telephone calls to exchange users for multi-line, multi-function telephone applications. In businesses, typically, there will be several individually reachable telephone sets, each having a unique extension number. A basic function of the telephone exchange switch 14 is to receive incoming calls and distribute these calls as necessary to various individual telephone sets 20. While the telephone exchange switch 14 illustrated in FIG. 1 is shown with a single telephone set 20, it should be understood that various forms of telephone exchange switches can provide call distribution and calling features to several, sometimes hundreds of telephone set extensions. The telephone exchange switch 14 may operate on an analog or digital basis regarding voice transmissions yet is fully controllable by a central processing unit (CPU) contained in the switch and through electronic communications over the data link 16 with the voice mail system 12. As previously stated, the data link 16 is intended to replace the convention DTMF (dual tone multi-frequency) link between the independent voice mail system 12 and the telephone exchange system switch 14 during call set-up. The present invention is not limited by such a replacement. The principles and equipment associated with the present invention are fully functional on systems that maintain both a data link 16 and a DTMF link between the voice mail system 12 and the telephone exchange system 14.

It should be understood that many of the arrangements or "means" provided by the present application are essentially computer circuitry preprogrammed with software in accordance with the method of the present invention to carry out the various steps associated with transferring messages between the voice mail system 12 and the telephone exchange switch 14 over the data link 16 and between the telephone exchange switch 14 and the various telephone sets 20 over the telephone cabling 18. Further, while FIG. 1 illustrates the basic hardware necessary to provide the system of the present invention and carry out the method of the present invention, other equipment may be added as necessary without departing from the spirit and scope of the present invention. In addition, with respect to the software, one of ordinary skill in the art of software programming should be able to provide the necessary code, commands and message protocols for the equipment to carry out the functions as described by the method of the present invention. It will be understood that certain protocols are required to convey information between the voice mail system 12 and the telephone exchange switch 14. While necessary to carry out the present invention, the present invention is not directed solely to specific message protocols but rather to the overall system and method that is facilitated by the use of such protocols and software programming code.

Turning now to the functional aspects of the present invention, and in accordance with the method thereof, a series of operations will be presented with each of the operations being performed by the system illustrated in FIG. 1 and described above.

Figure 2A:
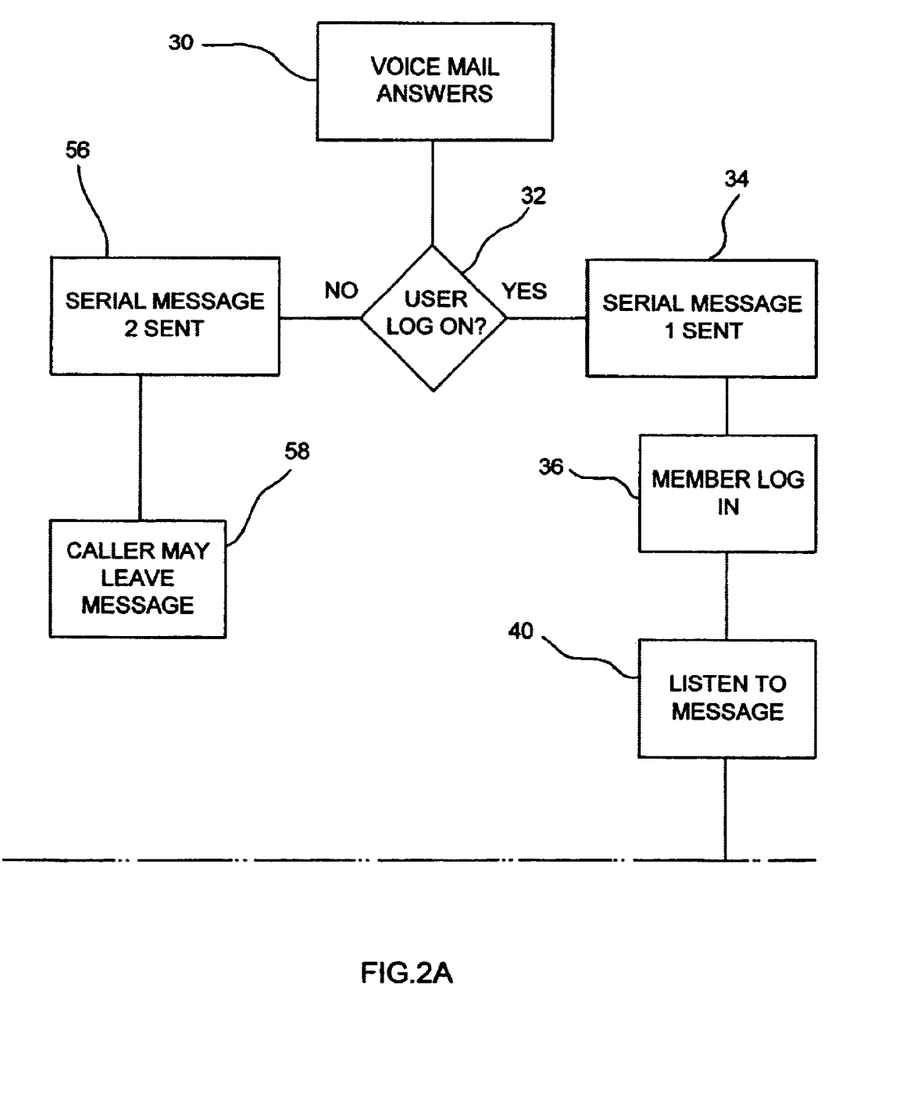
FIG. 2 is a flowchart of a messaging process as carried out by the present invention.
Figure 2B:
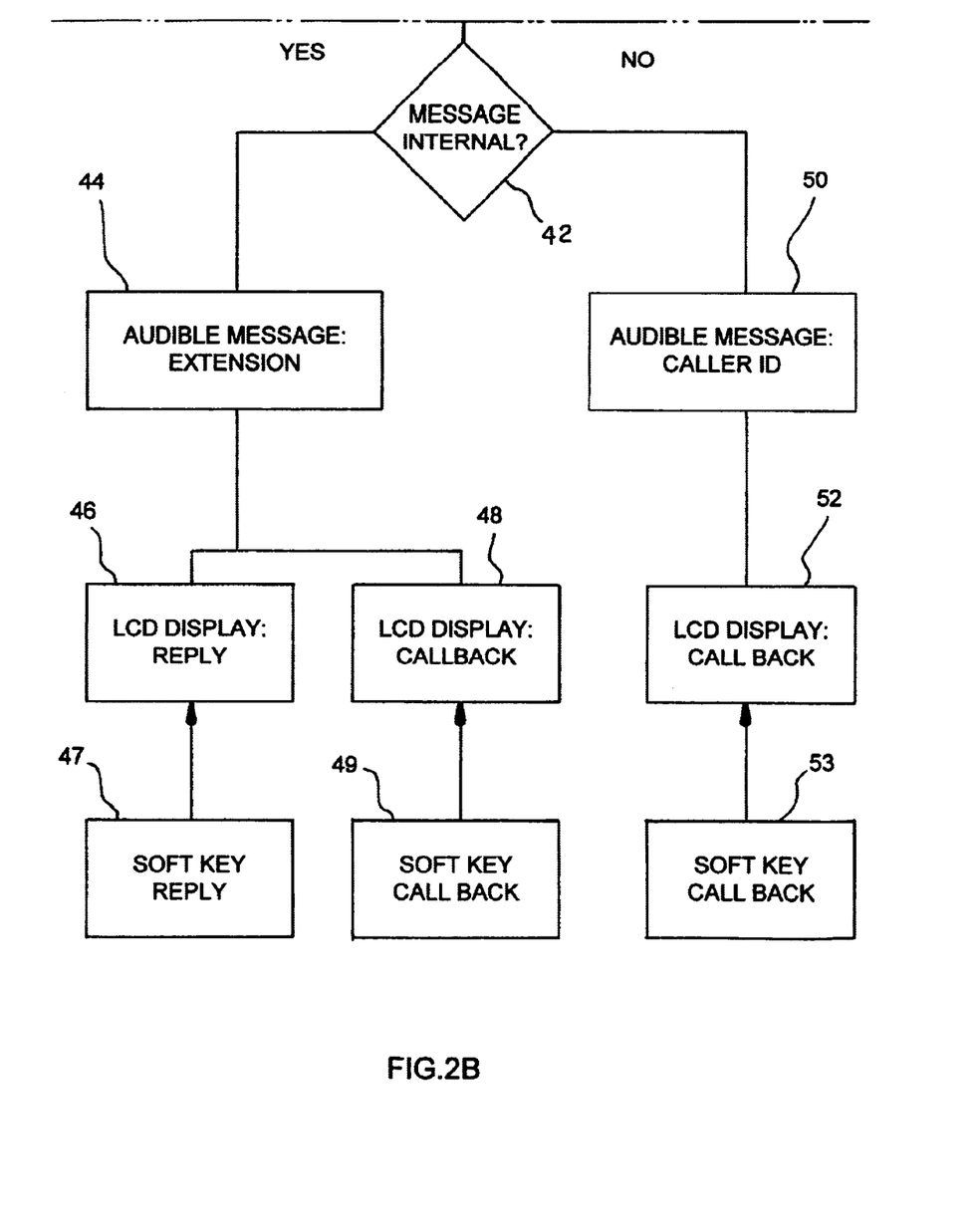

Turning now to FIG. 2, enhanced personal messaging is illustrated in a flowchart form. The flowchart incorporates use of some equipment as described with respect to the system above and it will be clear from the following description what equipment is required and when the equipment is used.

An incoming call to the voice mail system 12 shown in FIG. 1 begins with the "voice mail off hook when ringing" signal meaning that voice mail has answered the call as illustrated at 30 in FIG. 2. This initiates a decision of whether a user is logging on as illustrated at 32. If a user is logging on, predetermined data message 1, a "user logon" message, illustrated at 34, is sent. This could also result from a user logging on directly to voice mail. Prior to logging on, the user will see the number of messages awaiting since the LCD display 22 displays the number of messages stored. Serial Message 1 is forwarded over the data link as illustrated at 16 in FIG. 1. The member then logs into the voice mail system 12 as illustrated at 36. The user may then select to listen to a chosen message as illustrated at 40. A query is then made as to whether the messages are internal as illustrated at 42. If the message is internal, an audible message will be presented indicating the extension of the caller leaving the message as illustrated at 44. The LCD display 22 will present the options to the user to reply, as illustrated at 46 or to call back as illustrated at 48. Soft keys are available for response as illustrated at 47 and 49. Optionally, the LCD display 22 can be configured to display the extension.

If the message was not internal as queried at decision 42, then the message must be external and an audible message will present the caller identification information, generally the caller's number as illustrated at 50. The LCD display 22 will then present a call back option as illustrated at 52 which can be activated using a soft key as illustrated at 53. Optionally, the LCD display 22 can be configured to display the caller identification information.

If at the decision at user log on illustrated at 32, the user did not log on, then the caller would be leaving a message. There, serial message 2 as illustrated at 56 is sent over the data link 16. Predetermined serial message 2 is an "incoming call message" sent from the telephone switch exchange to the voice mail system when a call is presented to the voice mail system 12 due to a called party being forwarded to voice mail. The telephone exchange switch 14 sends this message to the voice mail system 12 when a call is presented to the voice mail system 12 indicating that the calling party wishes to record a message for the called party. The caller could then leave a message as indicated at 58.

Figure 3:
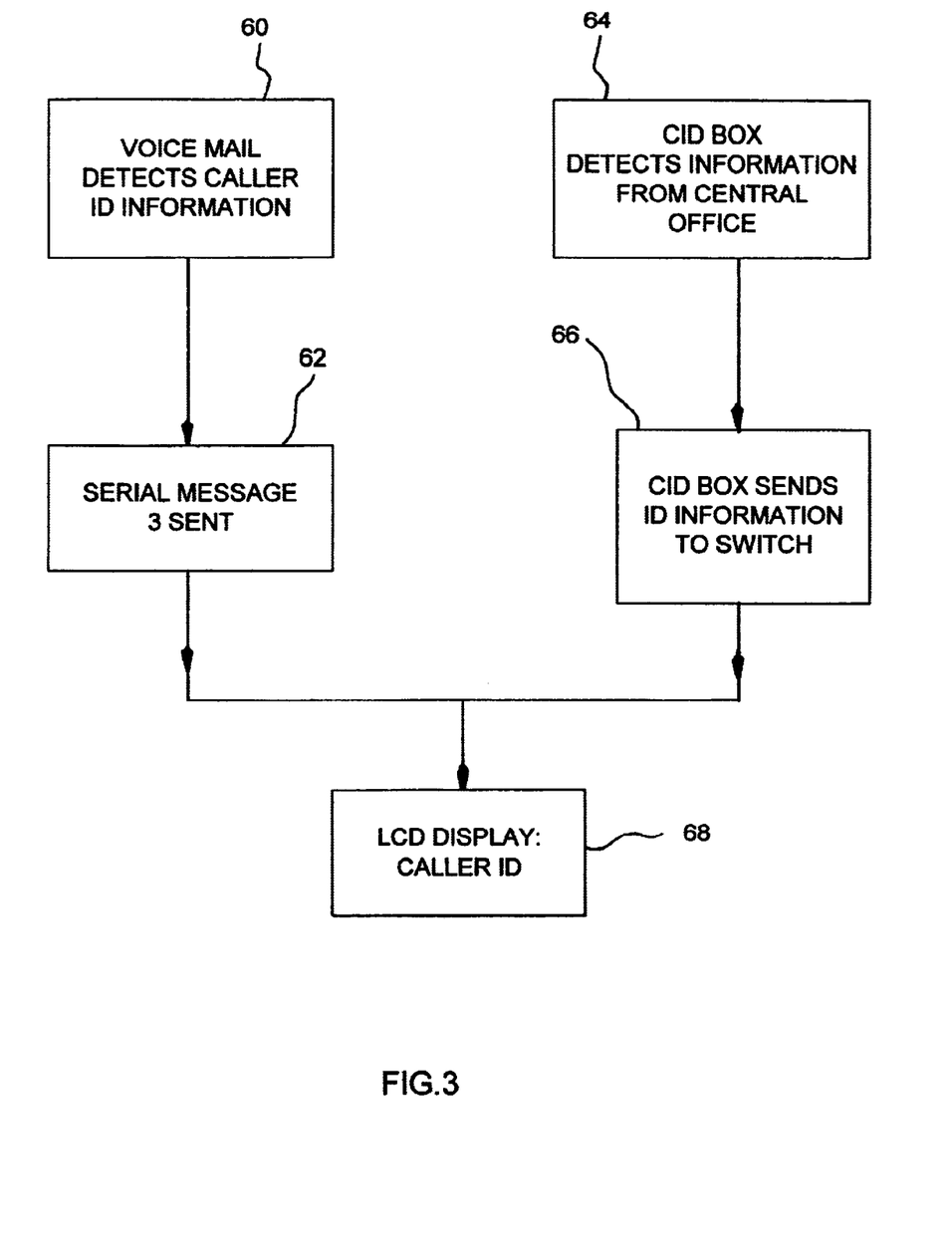
FIG. 3 is a block diagram illustrating a caller identification process as carried out by the present invention.

Referring now to FIG. 3, the present system and method can provide caller identification information even in the absence of a separate caller identification box as is known in the art. FIG. 3 illustrates both methods in conjunction to provide caller identification, also know as CID, information. In accordance with the present invention, the voice mail system 12 detects caller identification information as illustrated generally at 60 and then predetermined serial message 3 illustrated at 62 is sent to the telephone exchange switch 14 from the voice mail system 12 over the data link 16. Serial message 3 is a "collect digits" message. Not only can the voice mail system 12 detect caller ID information, the telephone exchange switch 14 can use the voice mail system as a service through which it can ask the caller to input some identification number, for example, an account number. After the voice mail system 12 has collected the digits, it uses the "collect digits" message to pass them to the telephone exchange switch 14. The caller identification information is then presented on the LCD display 22 as illustrated at 68.

Optionally, a caller identification box can collect caller ID information as illustrated at 64 which is then sent from the box to the switch as illustrated 66. The LCD display 22 will then display the caller ID information as illustrated at 68. The use of the caller ID box alone will not support the digit collection method.

Figure 4:
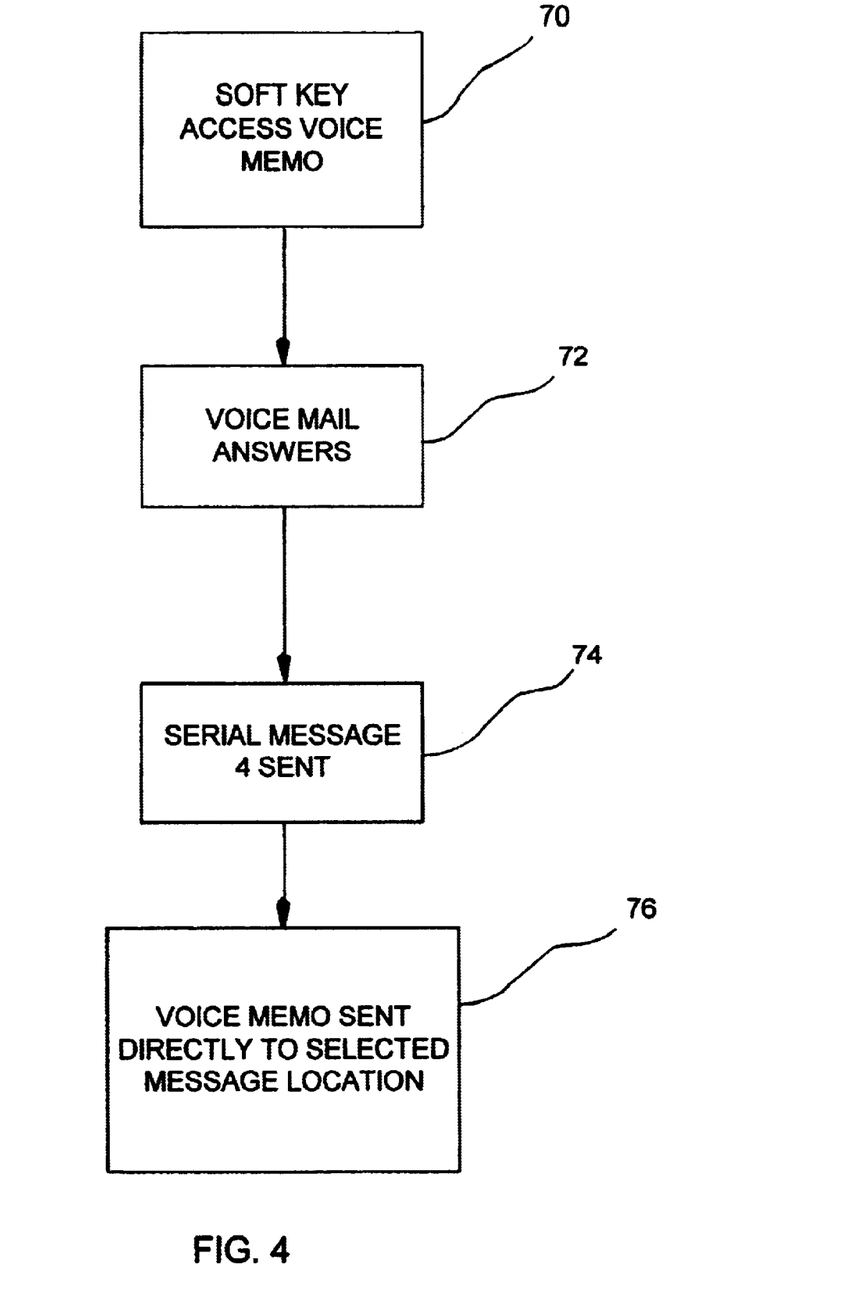
FIG. 4 is a flowchart of a voice memo process as carried out by the present invention.

The present invention also provides a user with the ability to send a voice memo directly to a message location, as illustrated in FIG. 4. This allows a subscriber or user to easily send a message to another subscriber or user by pressing soft key or programmable button followed by the recipient user's extension information. This feature eliminates the need for the user to log into his or her designated message storage location or mailbox, and complete the keystrokes as necessary to send a message from within the mailbox. As illustrated in FIG. 4, the user accesses the voice mail function from a soft key as illustrated at 70. The voice mail answer condition is established when voice mail answers as illustrated at 72. Serial message 4 may then be sent as illustrated at 74 resulting in a voice memo being sent directly to the selected message location as illustrated at 76. Serial message 4 is a "send message direct" message sent from the telephone exchange switch 14 to the voice mail system 12 when an extension user presses a soft key 24. The telephone exchange switch 14 will initiate the call to the voice mail system 12 and send the message which contains the voice mail port extension, the caller's extension and optionally, the destination mailbox number which is typically the same as the extension number. If there is no mailbox number then the voice mail will prompt the user to enter one.

Figure 5:
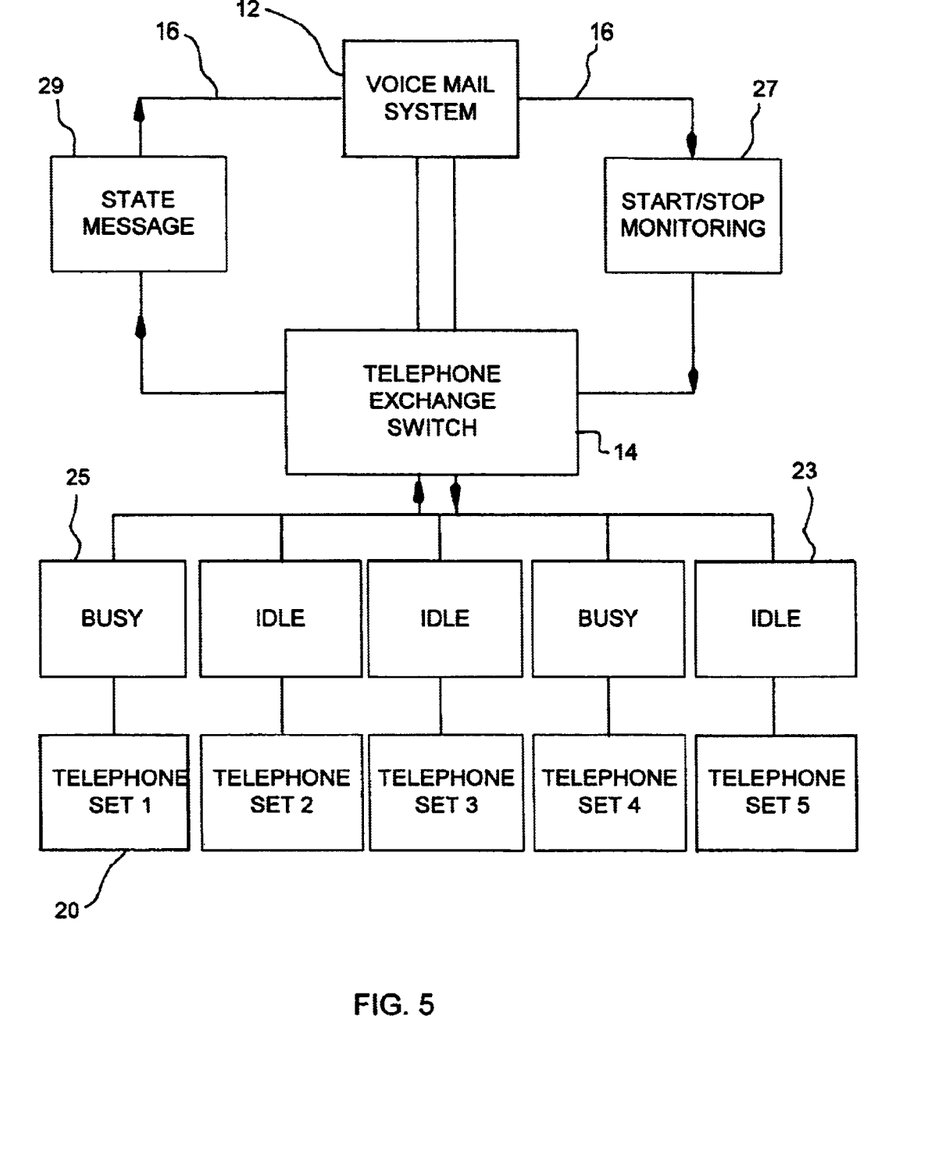
FIG. 5 is a block diagram illustrating a busy state messaging process as carried out by the present invention.

Turning now to FIG. 5, it will be seen that the present invention can enhance the ability of an automated call distribution system to effectively and timely distribute calls. With continued reference to FIG. 5, the voice mail system 12 will exchange messages with the telephone exchange switch 14 over the data link 16. Part of the message exchange includes message regarding the state of the individual telephone sets in the call distribution system. The state of the telephone set may be either idle or busy. In accordance with the automated call distribution system, the voice mail system 12 may monitor the state message for each telephone set 20 in the system. To initiate monitoring the voice mail system requests that the switch inform the voice mail system each time the given extension changes its state. A "stop monitoring extension" message is available to stop monitoring a specific extension by causing that station to stop generating state messages. During monitoring, the switch informs the voice mail system when an extension has gone from idle to busy in the form of a state message as illustrated at 29. The start/stop monitoring messages are illustrated generally at 27. The data link is illustrated twice at 16 for clarity. Therefore, a telephone set 20 may inform the switch that it is busy as illustrated at 25 or is idle as illustrated at 23. The telephone exchange switch 14 then informs the voice mail system 12 which is monitoring the calls within its distribution system of any change of state of a telephone set as illustrated at 29. Once the state changes from busy to idle, the voice mail system can distribute the next call in the queue to the most recently idle telephone set 20. This feature expedites transfers, as the system must no longer attempt to transfer then wait for call progress tones. If the telephone sets 20 are busy, the system immediately plays a busy greeting or queues the call.

Figure 6:
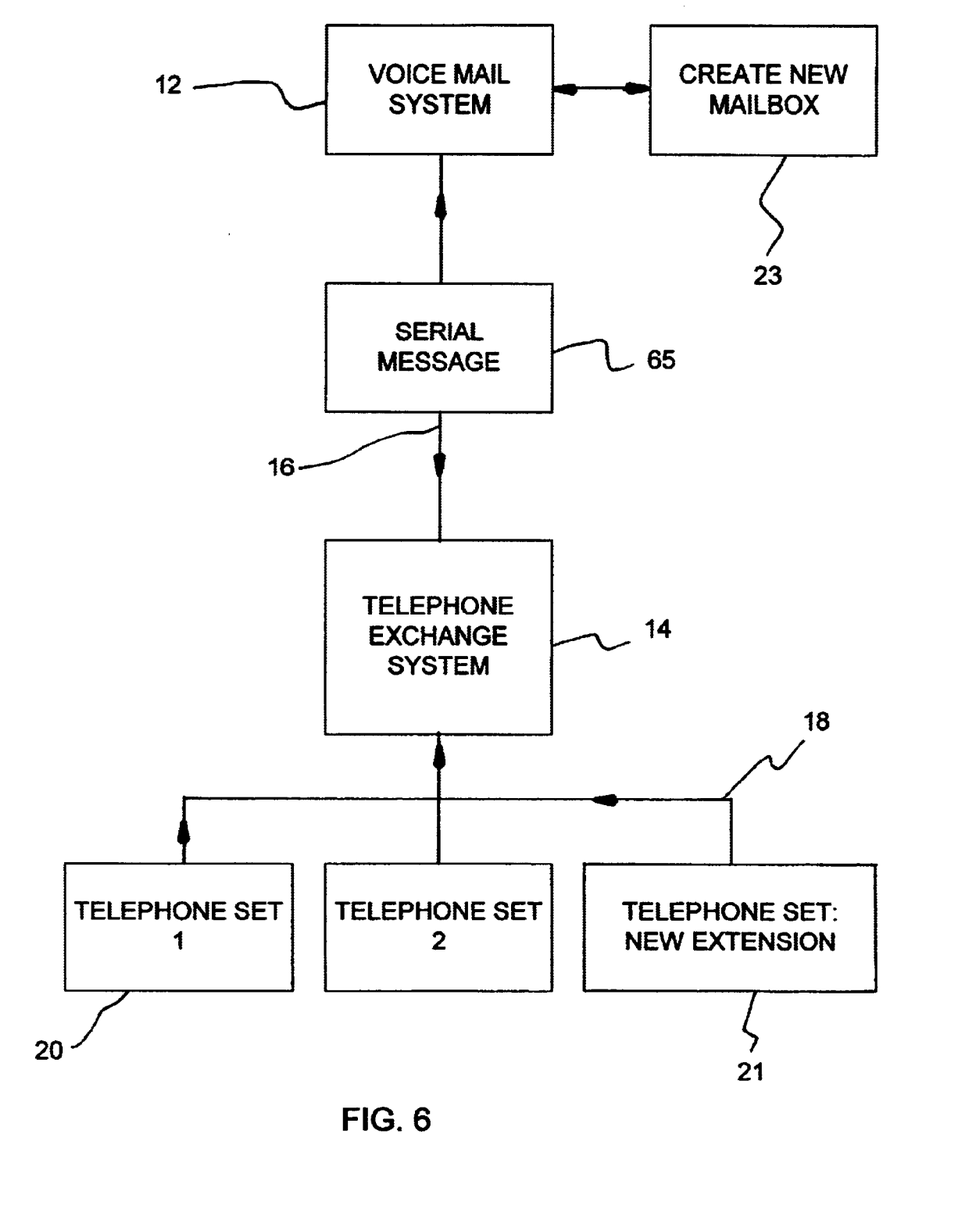
FIG. 6 is a flowchart illustrating a database updating process as carried out by the present invention.

Another feature of the present invention allows automatic updating of the voice mail system database, as illustrated in FIG. 6. As previously discussed, the voice mail system 12 includes a database of all users and their extensions. According to the present invention, when the voice mail system 12 needs to know the name of an extension, such as a new extension illustrated at 21, it will send an "update database" message to the switch. On the other hand, when the extension number or name changes, a new extension 21 is established or an existing extension removed, or when the voice mail system 12 sends a request, the telephone exchange switch 14 will send an "extension ID" message to the voice mail with the extension number, extension name and its state. The voice mail system can then create a new mailbox as illustrated at 23 in FIG. 6.

Figure 7:
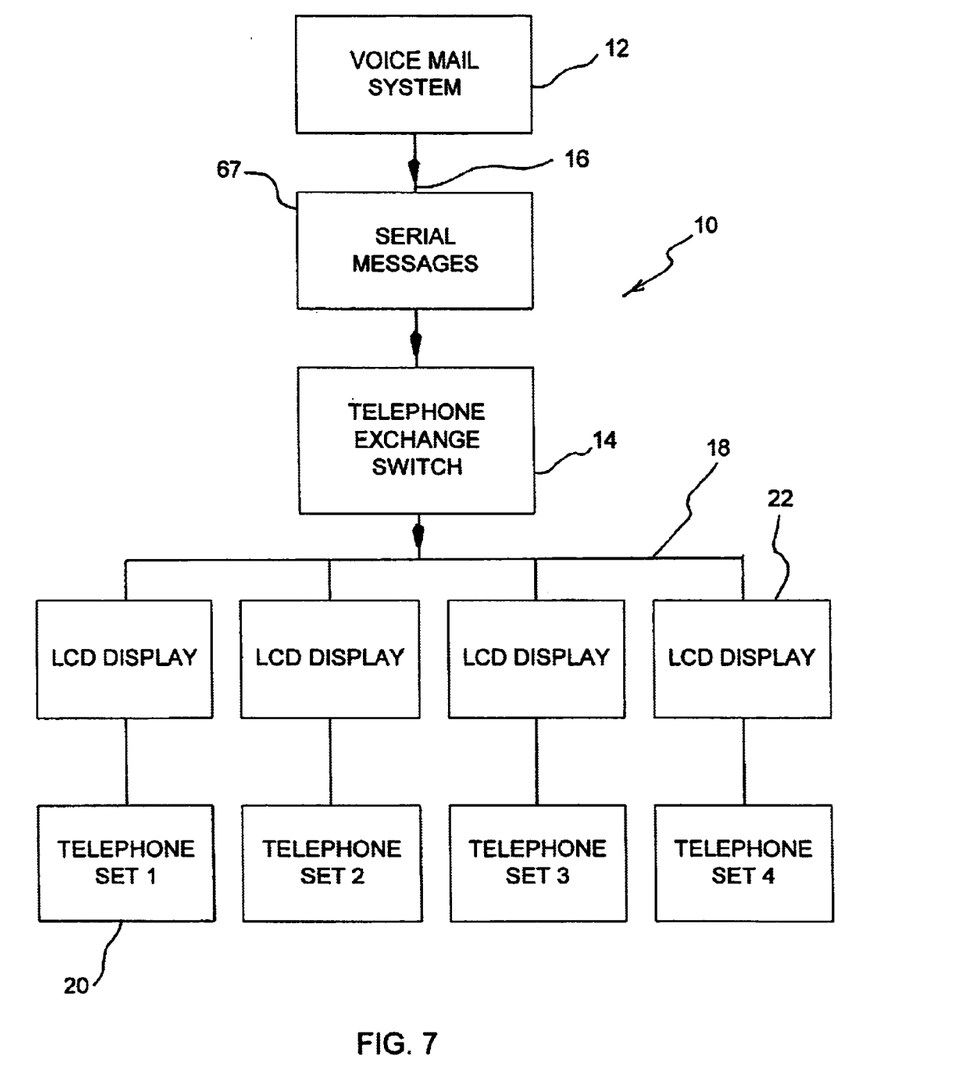
FIG. 7 is a block diagram illustrating an automated call distribution control process as carried out by the present invention.

Turning now to FIG. 7, the automated call distribution functionality can be accessed from the LCD display 22 of a telephone set 20. It will be understood, and as illustrated in FIG. 7, that the telephone set 20 is one of a plurality of telephone sets for call distribution. When an automated call distribution agent logs into the automated call distribution group on the voice mail system 12, the telephone exchange switch 14 will allow the voice mail system 12 to control the LCD display 22 on the telephone set 20. This will be accomplished using two serial messages as indicated at 67 in FIG. 7. When the voice mail system 12 wants to control the LCD display 22 as directed by the automated call distribution agent, the voice mail system 12 will send an open display message to the switch. During that period, the telephone exchange switch 14 will only update the LCD display 22 with automated call distribution messages from the voice mail system 12. When the automated call distribution agent has completed the tasks giving rise to the LCD control, the voice mail system 12 will send a "close display" message to the telephone exchange switch 14 and normal operation will resume.

Figure 8:
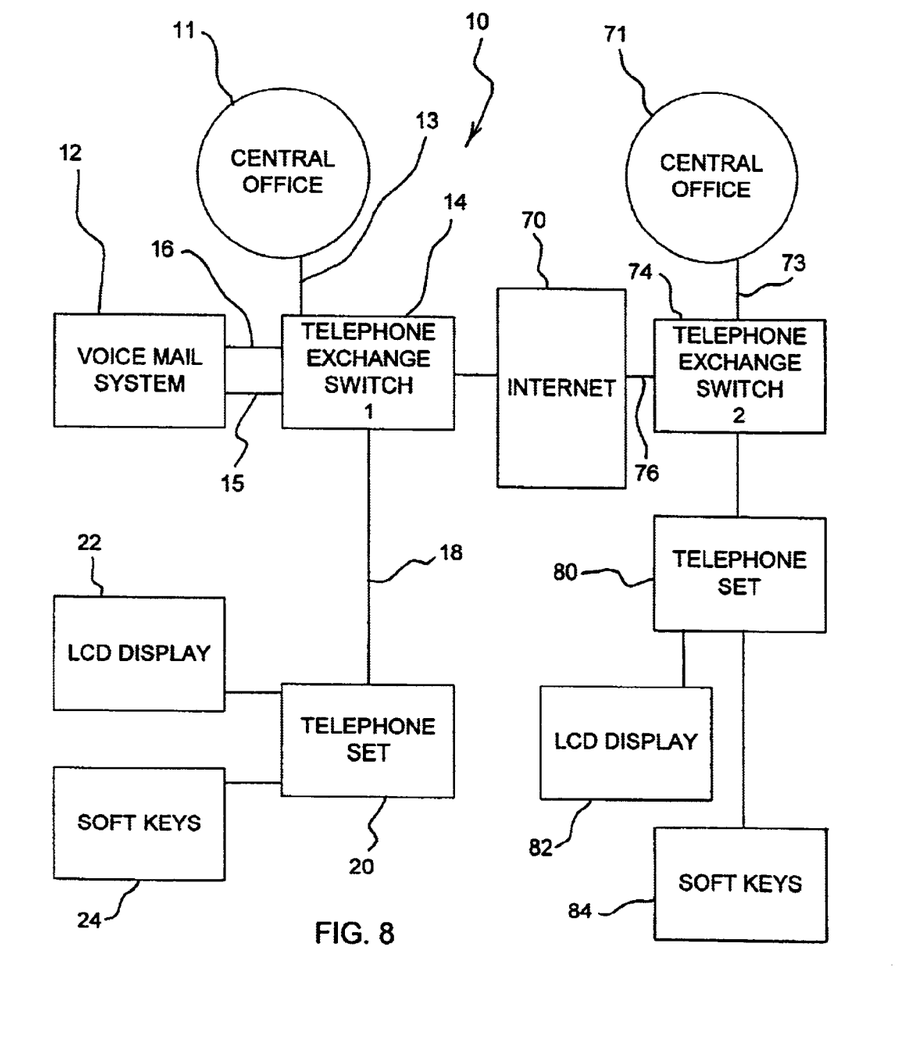
FIG. 8 is a block diagram illustrating another preferred embodiment of the present invention having internet-based interconnectivity with a second telephone exchange system.

Optionally, as illustrated in FIG. 8, the present invention may be configured and function to use an internet connection in accordance with the data integration presented hereinbefore. A second telephone exchange switch 74 may be provided at a remote location. The second telephone exchange switch 74 is connected to the first telephone exchange switch 14 through the internet 70 using standard internet digital connections 76 that can carry both data and voice signals. Further, both the first and second telephone exchange switches 14, 74 are in electronic communication with respective central offices 11, 71 of a public network through standard telephone cabling 13, 73. One or more telephone sets 80 are connected to the second telephone exchange switch 70. The additional telephone sets are equipped with an LCD display 82 and soft keys 84, and function in a manner similar to the telephone sets 20 connected to the first telephone exchange switch 14. Operational use of the second telephone exchange switch 74 and its telephone sets 80 is similar to the operation described above except that an internet connection must be established between the first telephone exchange switch 14 and the second telephone exchange switch 74. In this manner, users connected to the second telephone exchange switch 74 can use the voice mail system connected to the first telephone exchange switch 14 in a seamless manner, i.e., as if they were directly connected to the first telephone exchange switch 14.

As can be seen from the above, the present invention provides enhanced message capabilities by integrating the voice mail system 12 with the telephone exchange switch 14 in a telephone switching system 10 using a data link 16 for message exchange between the telephone exchange switch 14 and the voice mail system 12. This provides more complete support for the telephone sets 20 and their associated users. The telephone sets can now become more interactive and provide more services through the use of the LCD display 22 in combination with the soft keys 24.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A telephone switching system for facilitating and controlling voice and data communication among and between telephone sets, both internal to said system and external to said system, said system comprising:

a telephone exchange switch controllable by a central processing unit (CPU) contained within said telephone exchange switch, said CPU also being used for forming predetermined messages;

a voice mail system in electronic communication with said telephone exchange switch using a data communications link for message exchange between said telephone exchange switch and said voice mail system, said data link being in addition to a voice link between said telephone exchange switch and said voice mail system, said voice mail system including means for forming predetermined messages for said message exchange, said message exchange also serving to control said telephone exchange switch; and at least one telephone set in electronic communication with said telephone exchange switch, said telephone set including means for displaying alphanumeric characters in a human readable form, said means for displaying being operable responsive to at least one message received from said telephone exchange switch resulting from said message exchange between said telephone exchange switch and said voice mail system, said telephone set further including at least one manual switch for sending a signal to said telephone exchange switch responsive to said message received from said telephone exchange switch resulting from said message exchange between said telephone exchange switch and said voice mail system, said signal being indicative of a predetermined response to said message from said voice mail system an automated call distribution system associated with said voice mail system and a plurality of telephone sets connected to said telephone exchange switch, each of said telephone sets having a designated message location associated with said voice mail system, each said message location being accessible by a respective telephone set for communication therebetween, said system further comprising means for determining a state associated with each said telephone set being controlled by said automated call distribution system, said state defining whether each said telephone being controlled by said automated call distribution system is in a busy condition and means for communicating said state for each telephone set being controlled by said automated call distribution system to said voice mail system as a state message using said data link, said voice mail system further including means for monitoring each said state message and transferring incoming telephone calls to telephone sets for which said respective state message indicates as being idle, said voice mail system including means for selectively initiating and stopping said generation of each said state message for any specific extension and wherein said switch includes means for determining whether each said telephone set being controlled by said automated call distribution system changes from an idle condition to a busy condition and, upon detection of said change transmitting said state message to said voice mail system.

2. A telephone switching system according to claim 1 further including a means for controlling information displayed on said display device, said means for controlling including means for sending an initial message to open said display device, at least one message to provide information regarding said automated call distribution system, and a message to close said display device.

3. A telephone switching system according to claim 1 wherein said voice mail system maintains a database of information relating to each said telephone set and a respective designated message location thereof; the system further including a means for supplying information regarding each respective telephone set from said switch to said voice mail system for updating information used by said voice mail system with respect to each said telephone set.

4. A telephone switching system according to claim 1 wherein said telephone exchange switch is a first telephone exchange switch, said system further comprising:
   a second telephone exchange switch remotely disposed from said first telephone exchange switch;
   means for electronically connecting said second telephone exchange switch to said first telephone exchange switch through the internet;
   at least one second telephone set in electronic communication with said second telephone exchange switch, said second telephone set including means for displaying alphanumeric characters in a human readable form, said means for displaying being operable responsive to at least one message received from said second telephone exchange switch resulting from said message exchange between said second telephone exchange switch and said voice mail system, through the internet and said first telephone exchange switch, said second telephone set further including at least one manual switch for sending a signal to said second telephone exchange switch responsive to said message received from said second telephone exchange switch resulting from said message exchange between said second telephone exchange switch and said voice mail system through the internet and said first telephone exchange switch, said signal being indicative of a predetermined response to said message from said voice mail system.

5. A computer implemented method for operating a telephone switching system for facilitating and controlling voice and data communication among and between telephone sets, both internal to said system and external to said system, said method comprising the steps of:
   providing a telephone exchange switch controllable by a central processing unit (CPU) contained within said telephone exchange switch, said CPU also being used for forming predetermined messages;
   providing a voice mail system in electronic communication with said telephone exchange switch using a data communications link for message exchange between said telephone exchange switch and said voice mail system said voice mail system including means for forming predetermined messages said data communications link being in addition to a voice link between said telephone exchange switch and said voice mail system, said message exchange serving to control the telephone exchange switch;
   providing at least one telephone set in electronic communication with said telephone exchange switch, said telephone set including means for displaying alphanumeric characters in a human readable form, said means for displaying being operable in response to at least one message received from said telephone exchange switch resulting from said message exchange between said telephone exchange switch and said voice mail system, said telephone set including at least one manual switch operatively associated with said means for displaying;
   forming predetermined messages for said message exchange using said voice mail system and said telephone exchange switch;
   exchanging said predetermined messages between said voice mail system and said telephone exchange switch; and
   operating said means for displaying responsive to at least one message received from said telephone exchange switch resulting from said message exchange between said telephone exchange switch and said voice mail system
   providing an automated call distribution system associated with said voice mail system and a plurality of telephone sets connected to said telephone exchange switch each of said telephone sets having a designated message location-associated with said voice mail system, each said message location being accessible by a respective telephone set for communication therebetween;
   determining a state associated with each said telephone set being controlled by said automated call distribution system using said telephone exchange switch, said state defining whether each said telephone being controlled by said automated call distribution system is in a busy condition;
   communicating said state for each telephone set being controlled by said automated call distribution system to said voice mail system as a state message using said data link;
   monitoring each said state message and transferring incoming telephone calls to telephone sets for which said respective state message indicates as being idle, said monitoring and transferring being performed by said voice mail system;
   selectively initiating and stopping said generation of each said state message for any specific station using said voice mail system;
   determining whether each said telephone set being controlled by said automated call distribution system changes from an idle condition to a busy condition using said telephone exchange switch; and
   transmitting, upon detection of said change said state message to said voice mail system.

6. A computer implemented method for operating a telephone switching system according to claim 5 including the further step of controlling information displayed on said display device by:
   sending an initial message to open said display device;
   sending at least one message to provide information regarding said automated call distribution system; and
   sending a message to close said display device.

7. A computer implemented method for operating a telephone switching system according to claim 5 wherein step of providing a telephone exchange switch includes providing a first telephone exchange switch and said method further includes the steps of:
   providing a second telephone exchange switch remotely disposed from said first telephone exchange switch;
   providing means for electronically connecting said second telephone exchange switch to said first telephone exchange switch through the internet;

providing at least one second telephone set in electronic communication with said second telephone exchange switch, said second telephone set including means for displaying alphanumeric characters in a human readable form, said means for displaying being operable responsive to at least one message received from said second telephone exchange switch resulting from said message exchange between said second telephone exchange switch and said voice mail system, through the internet and said first telephone exchange switch, said second telephone set further including at least one manual switch for sending a signal to said second telephone exchange switch responsive to said message received from said second telephone exchange switch resulting from said message exchange between said second telephone exchange switch and said voice mail system through the internet and said first telephone exchange switch, said signal being indicative of a predetermined response to said message;

connecting said second telephone exchange switch with said first telephone exchange switch using said internet connection;

forming predetermined messages for said message exchange using said voice mail system and said second telephone exchange switch;

exchanging said predetermined messages between said voice mail system and said second telephone exchange switch through said first telephone exchange switch and said internet connection; and operating said means for displaying responsive to at least one message received from said second telephone exchange switch resulting from said message exchange between said second telephone exchange switch and said voice mail system.

8. A computer implemented method for operating a telephone switching system according to claim 7 wherein said method further includes the step of:

sending a signal using said at least one manual switch, said signal being sent to said second telephone exchange switch in response to said message received from said second telephone exchange switch resulting from said message exchange between said second telephone exchange switch and said voice mail system through said first telephone exchange switch and said internet connection, said signal being indicative of a predetermined response to said message received from said second telephone exchange switch.

\* \* \* \* \*